March 29, 1966 HUGH L. DRYDEN, DEPUTY ADMINISTRATOR OF THE NATIONAL AERONAUTICS AND SPACE ADMINISTRATION 3,243,154
VIBRATION DAMPING SYSTEM
Filed April 3, 1964
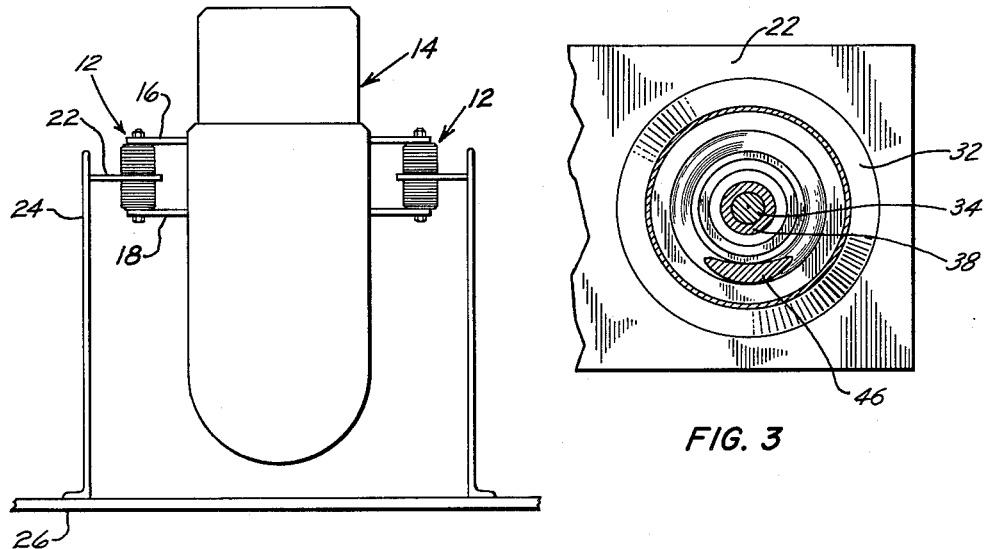
FIG. 1
FIG. 3
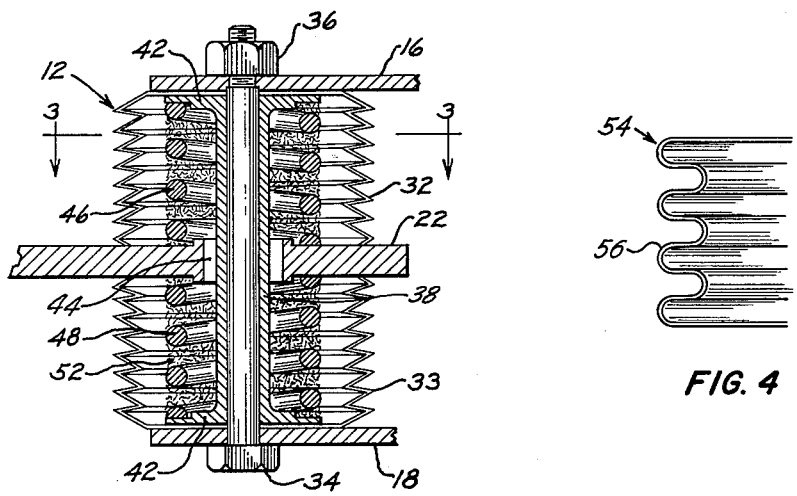
FIG. 2
FIG. 4
INVENTORS
Trent H. Holmes
Thomas C. Walsh
BY
ATTORNEY

United States Patent Office 3,243,154
Patented Mar. 29, 1966

3,243,154
VIBRATION DAMPING SYSTEM
Hugh L. Dryden, Deputy Administrator of the National Aeronautics and Space Administration, with respect to an invention of Trent H. Holmes and Thomas C. Walsh
Filed Apr. 3, 1964, Ser. No. 357,340
4 Claims. (Cl. 248—358)

This invention relates in general to vibration damping systems and, more particularly, to a vibration damper construction for use under extremely low pressure or vacuum conditions.

In the operation of mechanisms, particularly those mounted on spacecraft traveling in outer space, vibrations are often encountered which must be reduced or eliminated. The utilization of conventional vibration dampers in a spacecraft in an area which is exposed to the space vacuum or to extremely low pressures is limited by the fact that when a space vehicle is operated under these conditions unique problems arise which are not present under normal atmospheric conditions.

For example, under normal atmospheric conditions exposed solid surfaces will adsorb films of oxygen and water. These surfaces are considered "dirty" and the film acts as a lubricant thus reducing friction between the adjacent surfaces. However, under low pressure or vacuum conditions these same surfaces which would normally be considered "dirty" become "clean" and free from adsorbed films. The cleaning of the "dirty" surfaces takes place by the loss of gases into the vacuum or low pressure surrounding atmosphere. With certain metals the adsorbed gases may dissolve into the metal and diffuse therein, leaving the surface clean.

However, certain metals originally may have had carbon dissolved therein in the manufacturing process. This carbon can diffuse to the surface and react with the adsorbed oxygen or water to form carbon monoxide which is less strongly adsorbed. Further, mechanical wear between adjacent mating surfaces provides another way in which these surfaces may become "clean." Once surfaces are clean they tend to stay clean as long as the metal remains in the vacuum.

Upon loss of the surface films and adsorbed gases, contact between uncontaminated surfaces results in galling and seizing or "cold-welding." The problem of prevention of "cold-welding" requires design consideration where surfaces come in contact with each other such as in bearings, switches, relays, etc.

One solution to the prevention of cold-welding involves the maintaining of surface contamination such that intimate contact of the surfaces does not occur. For example, oil or grease may be used as a lubricant between adjacent surfaces. However, oils tend to creep over clean surfaces and reach areas where they are not desired. This behavior also tends to increase the evaporation rate by increasing the surface areas. Further, because heat transfer tends to be poor in the absence of air, oils and grease which are unsatisfactory in a device operating in air may become too hot for proper functioning when the device operates in vacuum. Moreover, in vacuum or low pressure operating conditions, such as spacecraft operating in orbit or inter-space missions, there is a difficulty of resupplying the lubricant because of long time unattended operation and further, due to the absence of any gravity.

Solid lubricants, because of their general low vapor pressures, suffer less loss by evaporation than the liquid lubricants such as oil or grease. However, a solid coating tends to wear away and is not replaced by a flow as in the case of a liquid lubricant.

As can readily be seen, conventional vibration dampers which have heretofore been used on high speed aircraft or spacecraft can no longer be utilized when the mission will involve long periods of operation at extremely low pressure or vacuum conditions. Thus, these operational difficulties, which may be anticipated because of cold-welding of compounds of a conventional vibration damper, must be taken into account during the design of a spacecraft vibration damping system.

In order to overcome these attendant disadvantages, the vibration damper of the present invention is contained in a sealed medium so that when movement occurs between metals of the damper there is sufficient pressure present in the vicinity of adjacent contacting surfaces where a danger of "cold-welding" may occur. The damper of the present invention can be operated in extremely low vacuum conditions where normally metal surfaces would rapidly seize upon coming into contact with other surfaces which are "clean" due to the vacuum or low pressure environment.

More specifically, according to the invention a vibration damper comprises a pair of load receiving members which are secured to a body which is subject to vibrations. Each of the load receiving members is connected to and separated by a nut and bolt. A cylindrical spacer having end feet sleeves the bolt. Attached to a rigidly mounted body is a central support member which is in a plane parallel to each of the end plates and surrounds the bolt and is spaced therefrom by an orifice in the support member. Metal bellows are attached to the central support member and to each of the end plates and are secured thereto. A helical vibration and shock absorbing spring is connected between the central supporting member and each of the end plates. Further, dampening means are provided in the vicinity of the springs. The area defined by the metal bellows which surround the spring and damper may be contained in an inert or other suitable pressurizing gas. The resultant structure allows adjacent surfaces of the damper to interact in a gaseous medium wherein "cold-welding" will not occur while the damper is being operated in a high vacuum environment.

The advantage of this invention, both as to its construction and mode of operation, will be readily appreciated as the same become better understood by reference to the following detailed description when considered in connection with the accompanying drawings in which like referenced numerals designate like parts throughout the figures, and wherein:

FIG. 1 is a perspective view of a body having attached thereto a pair of vibration dampers in accordance with this invention.

FIG. 2 is a side view, partly in section, of one of the vibration dampers of FIG. 1 depicting the vibration damper in greater detail.

FIG. 3 is a top view, partly in section, taken along the line of 3—3 of FIG. 2.

FIG. 4 is a sectional view of an alternate arrangement of the bellows used in the vibration damper of FIGS. 1 through 3.

Referring now to the drawings, there is shown in FIG. 1 a pair of vibration dampers 12 in accordance with this invention which are used to reduce vibrations of a body 14. Each of the vibration dampers is attached to the body 14 by means of load-receiving plates 16, 18. A central support member 22 of the damper is attached to a mounting member 24 which in turn is connected to a rigid platform 26.

One of the vibration dampers 12 is shown in greater detail in FIGS. 2 and 3. The central support member 22 has a pair of metal bellows 32 and 33 welded thereto and to each of the load-receiving plates 16 and 18, respectively. A bolt 34 and nut 36 are secured to the end plates 18 and 16 respectively. Further, a spacer 38 surrounds the bolt 34 and has feet 42, the end portion of which are welded to the metal bellows. A central orifice 44 in the central support member 22 surrounds the spacer 38 and is spaced therefrom. Helical vibration and shock absorbing springs 46 and 48 are connected from the central support member to each of the feet 42. The spacer 38 should be made of material which will resist the loads of the bolt 34 and further, will not be damaged by the sliding action of the springs 46 and 48. Since the feet 42 of the spacer are welded to the bellows, a metal such as stainless steel is a suitable material for the spacer. Further, vibration absorbing material 52 is intermeshed in and around the area of the springs 46 and 48.

An inert gas, such as nitrogen or helium, is introduced into the sealed area defined by the bellows 32 through an opening therein (not shown) which is then sealed. Normally it is not necessary to remove the gas after the unit has been sealed. However, should it become necessary a mechanical arrangement for inserting or removing the gas can easily be made. Pressures in the enclosure are normally kept low, such as 15 to 30 p.s.i.a., in order that a minimum load is placed upon the metal bellows 32 and 33.

The movement of the body member 14 is transferred to the load receiving members 16 and 18, which in turn causes the damper 12 to move in an axis parallel to that of the axis of the bolt. Movement of the load receiving members 16 and 18 in a downward direction in FIG. 3 causes the bellows 32 and spring 46 to contract while simultaneously the bellows 33 and spring 48 expand. Of course, when the direction of movement is reversed the bellows 32 and spring 46 expand while the bellows 33 and spring 48 in turn contract. The orifice 44 interconnects both chambers and thus, when the chamber surrounded by the bellows 32 contracts, thus reducing the volume encompassed by these bellows, the area surrounded by the bellows 33 expands. The orifice 44, however, allows gas from the contracted chamber to transfer to the expanded chamber. Thus, although the volume from the two chambers is varied, the pressure remains substantially constant due to the transference of the inert gas from one chamber to the other thereby preventing a substantial increase in pressure in the contracted chamber which in turn would cause a load to be placed on its respective bellows.

The absorbing material 52 which is intermeshed in the springs 46 and 48 acts as a snubber which further dampens the vibrations. Normally the material 52 may be steel wool which is an excellent snubber. Were it not for the fact that a gaseous medium was present in the damper 12, movement of the springs 46 and 48 with respect to the steel wool 52 would cause these two materials to "cold-weld." Further, any interaction between any other surfaces such as, for example, the spring 46 and the central support member 22 would also cause these contacting surfaces to "cold-weld." However, the presence of the pressurizing gaseous medium in the vibration damper prevents such a happening.

Referring now to FIG. 4 there is shown an alternate embodiment of the bellows of FIG. 3. The bellows of FIG. 3, while normally satisfactory for most conditions, might, upon extereme vibration, cause adjacent sides to move close to each other and due to the lack of any atmospheric gas on the outer surface of the bellows might cause the bellows itself to become "cold-welded." In FIG. 4 the bellows 54 are formed of a curved surface 56 which, in order for adjacent outer surfaces to come in contact with each other, require extreme vibrations to be applied to the damper which would not normally occur.

It should be understood that the foregoing disclosure relates only to preferred embodiments of the invention and that it is intended to cover all changes and modifications of the examples in the invention herein chosen for the purposes of the disclosure which do not constitute departures from the spirit and scope of the invention.

What is claimed and desired to be secured by Letters Patent is:

1. In combination:
In a spacecraft having a rigid body structure and adapted to operate in a vacuum environment, a vibration damping system comprising,
   (1) a pair of load receiving members located in parallel planes adapted to be secured to a body subject to vibration;
   (2) a support member located in a plane parallel to said load receiving members and interposed between the pair of load receiving members, said support member having an orifice therein whose axis is pependicular to said planes, said support member adapted to be secured to said rigid body structure;
   (3) a first and a second flexible cylindrically shaped metallic bellows having substantially the same axes as said orifice, said bellows having a first end portion and a second end portion, said first metallic bellows being connected to one side of the support member at said first end portion and to one of the load receiving members at said second end portion, and said second bellows being attached to the other side of the support member at said first end portion and the other load receiving member at said second end portion, said bellows being welded to said support member and said load receiving members so as to define sealed substantially cylindrical volumes between the support member and each of said load receiving members;
   (4) an inert gas filling said defined volumes and said orifice;
   (5) means for maintaining a substantially constant pressure in said defined volumes upon movement of said damping system comprising a shaft member extending through the orifice in said support member and interconnecting each of said load receiving members;
   (6) a cylindrical spacer having feet in its two ends, the spacer extending through said orifice and surrounding said shaft member, said spacer feet being welded to each of the bellows at said second end portions;
   (7) first and second helically coiled springs, said springs being in coaxial relationship with said bellows and interposed within said defined volume, said first spring engaging one side of the support member and one of the feet of the cylindrical spacer and said second spring engaging the other side of said support member and the other of the feet; and
   (8) vibration absorbing material intermeshed with each of said springs so that movement of said springs will be damped by said absorbing material;
whereby when said system is in operation in vacuum condition "cold-welding" will not occur between adjacent members located in said defined volumes.

2. A vibration damping system comprising:
first and second spaced-apart load receiving members adapted to be secured to a body subject to vibration;
a shaft member interconnecting each of said load receiving members;
a support member interposed between said load receiving members and adapted to be attached to a rigidly secured structure, said support member having an orifice therein, said shaft member being interposed in said orifice;
first and second flexible metallic bellows, said bellows each having first and second end portions and each of said bellows defining a volume, said first metallic bellows surrounding the portion of said shaft between said first load receiving member and one side of said support member, said first and second end portions of said first metallic bellows being welded to one side of said support member and said first load receiving member, respectively, said second metallic bellows surrounding the portion of the shaft between the other side of said support member and said second load receiving member, the first and second end portions of said second metallic bellows being welded to the other side of said support member and said second load receiving member, respectively;

a cylindrical spacer having feet at its two ends, said spacer extending through said orifice and sleeving said shaft member, one of said spacer feet being welded to the first end portion of said first metallic bellows and the other said spacer feet being welded to the first end portion of said second metallic bellows;

first and second helically coiled springs, said springs being interposed in the defined volume of said first and second metallic bellows, respectively, and surrounding said spacer, said first spring engaging said one side of said support member and one of said feet and said second spring engaging said other side of said support member and the other of said feet;

vibration absorbing material intermeshed with each of said springs so that movement of said springs will be damped by said absorbing material; and an inert gas filling said defined volumes and said orifice so that when the system is operating in vacuum condition "cold-welding" will not occur between adjacent members located in said defined volumes.

3. A vibration damping system comprising:

first and second spaced-apart load receiving members adapted to be secured to a body subject to vibration;

a shaft member interconnecting each of said load receiving members;

a support member interposed between said load receiving members and adapted to be attached to a rigidly secured structure, said support member having an orifice therein, said shaft member being interposed in said orifice;

first and second flexible bellows, said bellows each having first and second end portions and each of said bellows defining a volume, said first bellows surrounding the portion of said shaft member between said first load receiving member and one side of said support member, said first and second end portions of said first bellows being secured to one side of said support member and said first load receiving member, respectively, said second metallic bellows surrounding the portion of the shaft between the other side of said support member and said second load receiving member, the first and second end portions of said second metallic bellows being secured to the other side of said support member and said second load receiving member respectively;

spacing means extending through said orifice and sleeving said shaft member, said spacing means being secured to each of the bellows at the second end portions of said bellows;

a first and second spring, said first and second spring being interposed in the defined volume of said first and second metallic bellows, respectively, said first spring engaging one side of said support member and the portion of said spacing means secured to the the end portion of said bellows and said second spring engaging the other side of said support member and the other of said spacing means secured to the end portion of said bellows; and said defined volumes and said orifice being filled with a gaseous medium so that when the system is in operation in vacuum condition "cold-welding" will not occur between adjacent members located in said defined volumes.

4. A vibration damping system comprising:

first and second spaced-apart load receiving members adapted to be secured to a body subject to vibration;

a shaft member interconnecting each of said load receiving members and adapted to be attached to a rigidly secured structure, said support member having an orifice therein, said shaft member being interposed in said orifice;

first and second flexible bellows, said bellows each having first and second end portions and each of said bellows defining a volume, said first bellows surrounding the portion of said shaft member between said first load receiving member and one side of said support member, said first and second end portions of said first bellows being secured to one side of said support member and said first load receiving member, respectively, said second metallic bellows surrounding the portion of the shaft between the other side of said support member and said second load receiving member, the first and second end portions of said second metallic bellows being secured to the other side of said support member and said second load receiving member, respectively;

spacing means extending through said orifice and sleeving said shaft member, said spacing means being secured to each of the bellows at the second end portions of said bellows; and a first and second spring, said first and second spring being interposed in the defined volume of said first and second metallic bellows, respectively said first spring engaging one side of said support member and the portion of said spacing means secured to the end portion of said bellows and said second spring engaging the other side of said support member and the other said spacing means secured to the end portion of said bellows.

References Cited by the Examiner

UNITED STATES PATENTS

| 2,064,751 | 12/1936 | Hussman | 248—21 |
|---|---|---|---|
| 2,635,838 | 4/1953 | Branson | 248—20 |
| 3,013,816 | 12/1961 | Isham | 267—1 X |
| 3,162,164 | 12/1964 | Eck | 248—358 X |

FOREIGN PATENTS 682,584  11/1952  Great Britain.

References Cited by the Applicant

UNITED STATES PATENTS

| 2,417,037 | 3/1947 | Zuckerman. |
|---|---|---|
| 2,841,388 | 7/1958 | Hehn. |
| 3,014,382 | 12/1961 | Watson. |

CLAUDE A. LE ROY, *Primary Examiner.*

CHANCELLOR E. HARRIS, *Examiner.*

J. PETO, *Assistant Examiner.*